US012398026B2

(12) United States Patent
Zaguroli

(10) Patent No.: US 12,398,026 B2
(45) Date of Patent: Aug. 26, 2025

(54) HOIST ROTARY ASSEMBLY

(71) Applicant: Knight Industries & Associates, Inc., Auburn Hills, MI (US)

(72) Inventor: James Zaguroli, Auburn Hills, MI (US)

(73) Assignee: Knight Industries & Associates, Inc., Auburn Hills, MI (US)

(*) Notice: Subject to any disclaimer, the term of this patent is extended or adjusted under 35 U.S.C. 154(b) by 361 days.

(21) Appl. No.: 18/095,791

(22) Filed: Jan. 11, 2023

(65) Prior Publication Data

US 2024/0051803 A1 Feb. 15, 2024

Related U.S. Application Data

(60) Provisional application No. 63/397,494, filed on Aug. 12, 2022.

(51) Int. Cl.
*B66D 3/26* (2006.01)

(52) U.S. Cl.
CPC ............ *B66D 3/26* (2013.01); *B66D 2700/02* (2013.01)

(58) Field of Classification Search
CPC ........ B66D 3/00; B66D 3/26; B66D 2700/02; B66D 1/00; B66D 5/00
See application file for complete search history.

(56) References Cited

U.S. PATENT DOCUMENTS

| | | | | |
|---|---|---|---|---|
| 7,735,530 | B1 | 6/2010 | Riha et al. | |
| 7,909,120 | B2 * | 3/2011 | Slack | E21B 3/022 175/423 |
| 10,099,904 | B1 | 10/2018 | Zaguroli, Jr. | |
| 2008/0302289 | A1 * | 12/2008 | Mann | B66D 1/7484 254/266 |
| 2022/0233891 | A1 * | 7/2022 | Nieuwenhuis | A62B 1/10 |
| 2024/0051803 | A1 * | 2/2024 | Zaguroli | B66C 3/005 |

FOREIGN PATENT DOCUMENTS

| | | | |
|---|---|---|---|
| CH | 573861 | A5 | 3/1976 |
| GB | 765102 | A | 1/1957 |
| WO | 2022002871 | A1 | 1/2022 |

OTHER PUBLICATIONS

European Search Report for European Application No. 23188777.9 Feb. 14, 2024.

* cited by examiner

*Primary Examiner* — Lee D Wilson

(74) *Attorney, Agent, or Firm* — Carlson, Gaskey & Olds, P.C.

(57) ABSTRACT

A rotary assembly for a hoist includes at least one of a rotary union and a slip ring. A bearing is positioned radially outward of the rotary union and/or slip ring with respect to a central axis. A first plurality of axially extending support columns are radially outward of the rotary union and/or slip ring and fixed to the bearing. A second plurality of axially extending support columns are radially outward of the rotary union and/or slip ring and fixed to the bearing. The second plurality of axially extending support columns is axially opposite the bearing from the first plurality of axially extending support columns.

20 Claims, 9 Drawing Sheets

HOIST ROTARY ASSEMBLY

CROSS-REFERENCE TO RELATED APPLICATIONS

This application claims priority to U.S. Provisional Application No. 63/397,494, filed Aug. 12, 2022.

BACKGROUND

Hoists are used for lifting loads by winding up a wrappable element such as chain or cable, with the load attached to a fitting at the lower end of the wrappable element. Hoists may be used in manufacturing plants because they can lift loads safely without much effort required by workers. In manufacturing lines, hoists may transport raw materials or completed products between different stages along the assembly process.

SUMMARY

A rotary assembly for a hoist according to an example of this disclosure includes at least one of a rotary union and a slip ring. A bearing is positioned radially outward of the rotary union and/or slip ring with respect to a central axis. A first plurality of axially extending support columns are radially outward of the rotary union and/or slip ring and fixed to the bearing. A second plurality of axially extending support columns are radially outward of the at rotary union and/or slip ring and fixed to the bearing. The second plurality of axially extending support columns are axially opposite the bearing from the first plurality of axially extending support columns.

In a further example of the foregoing, the rotary union includes a first cylinder and a second cylinder rotatably attached to the first cylinder and rotatable about the central axis. The first plurality of axially extending support columns are at least partially axially aligned with the first cylinder. The second plurality of axially extending support columns are at least partially axially aligned with the second cylinder.

In a further example of any of the foregoing, one or more first fluid ports extend radially outward from the first cylinder one or more second fluid ports extend radially outward from the second cylinder. One or more internal fluid channels extend between the one or more first fluid ports and the one or more second fluid ports.

In a further example of any of the foregoing, the first cylinder is fixed against rotation, and the second cylinder is rotatable in a clockwise direction and a counterclockwise direction.

In a further example of any of the foregoing, the rotary union is integrated with the slip ring.

In a further example of any of the foregoing, an outer housing assembly includes a first outer housing cylinder, a second outer housing cylinder rotatable with the second cylinder, an upper plate at an upper end of the first outer housing cylinder, and a lower plate at the lower end of the second outer housing cylinder.

In a further example of any of the foregoing, the first plurality of axially extending support columns extend axially from the upper plate to the bearing. The second plurality of axially extending support columns extend axially from the lower plate to the bearing.

In a further example of any of the foregoing, a load cell is within the outer housing assembly for determining a force of a load of the hoist.

In a further example of any of the foregoing, a load shaft extends through the upper plate and has a flange received against the load cell, such that the load cell is received axially between the flange and the upper plate.

In a further example of any of the foregoing, the bearing and the first and second plurality of axially extending support columns bear the load, and the rotary union and/or slip ring does not bear the load.

A hoist system for raising and lowering a load according to an example of this disclosure includes an upper box, a chain or cable which extends from the upper box, and a rotary assembly between the chain or cable and the load. The rotary assembly includes at least one of a rotary union and a slip ring. A bearing is positioned radially outward of the rotary union and/or slip ring with respect to a central axis. A first plurality of axially extending support columns is radially outward of the rotary union and/or slip ring and fixed to the bearing. A second plurality of axially extending support columns is radially outward of the rotary union and/or slip ring and fixed to the bearing. The second plurality of axially extending support columns is axially opposite the bearing from the first plurality of axially extending support columns.

In a further example of the foregoing, the rotary union includes a first cylinder and a second cylinder rotatably attached to the first cylinder and rotatable about the central axis. The first plurality of axially extending support columns are at least partially axially aligned with the first cylinder, and the second plurality of axially extending support columns are at least partially axially aligned with the second cylinder.

In a further example of any of the foregoing, one or more first fluid ports extend radially outward from the first cylinder with respect to the central axis. One or more second fluid ports extend radially outward from the second cylinder. One or more internal fluid channels extend between the one or more first fluid ports and the one or more second fluid ports.

In a further example of any of the foregoing, the first cylinder is fixed against rotation, and the second cylinder is rotatable in a clockwise direction and a counterclockwise direction.

In a further example of any of the foregoing, the rotary union is integrated with the slip ring.

In a further example of any of the foregoing, an outer housing assembly includes a first outer housing cylinder, a second outer housing cylinder rotatable with the second cylinder, an upper plate at an upper end of the first outer housing cylinder, and a lower plate at the lower end of the second outer housing cylinder.

In a further example of any of the foregoing, the first plurality of axially extending support columns extend axially from the upper plate to the bearing, and the second plurality of axially extending support columns extend axially from the lower plate to the bearing.

In a further example of any of the foregoing, a load cell is within the outer housing assembly for determining a force of the load.

In a further example of any of the foregoing, a load shaft extends through the upper plate and has a flange received against the load cell, such that the load cell is received axially between the flange and the upper plate.

In a further example of any of the foregoing, the bearing and the first and second plurality of axially extending support columns bear the load, and the rotary union and/or slip ring does not bear the load.

These and other features may be best understood from the following specification and drawings, the following of which is a brief description.

DETAILED DESCRIPTION

This application relates generally to hoists, and more specifically to rotary assemblies and methods that allow for rotation of a hoist load while still having the ability to provide electrical and/or pneumatic through the rotary assembly.

Figure 1:
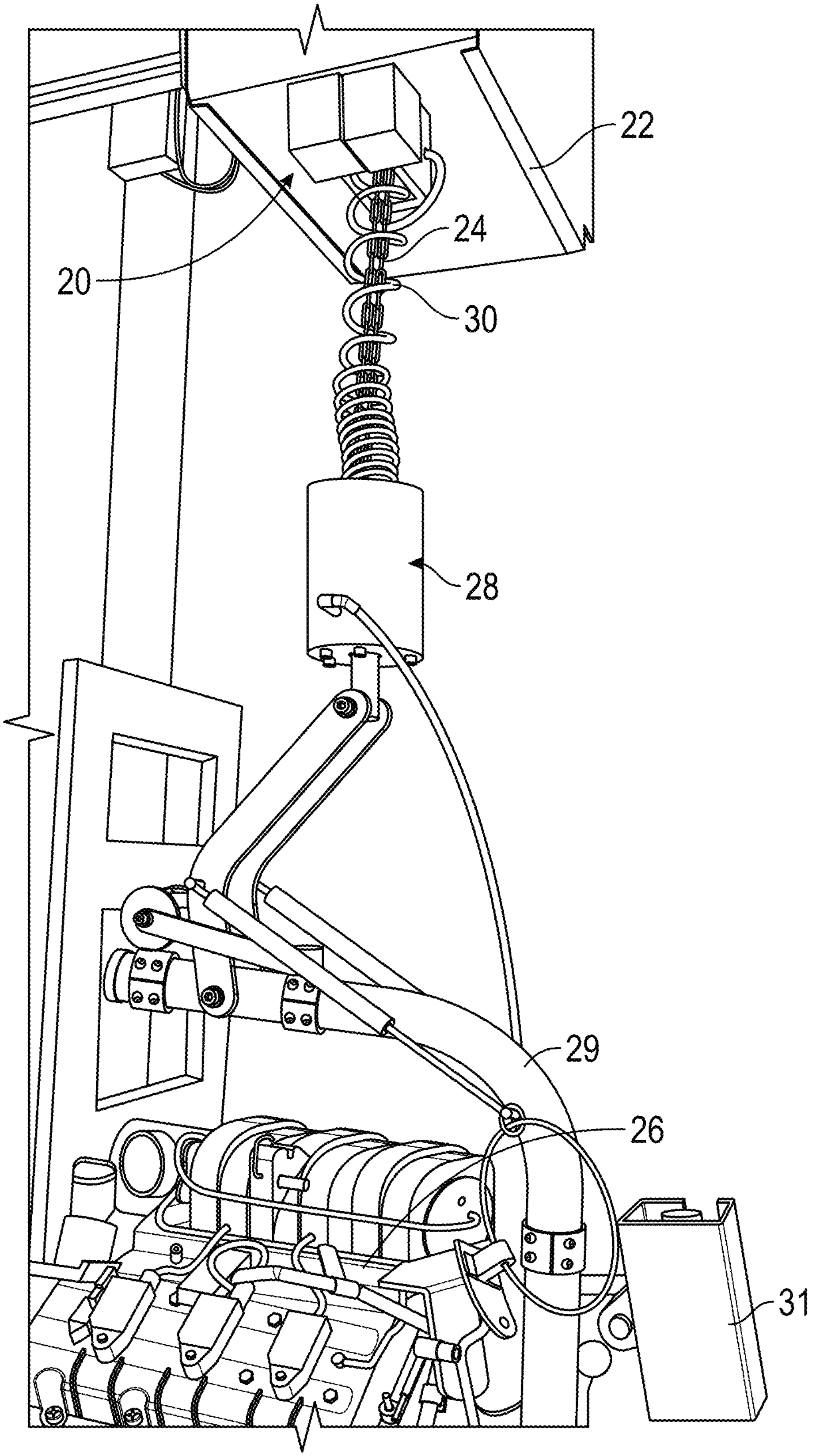
FIG. 1 illustrates an example hoist system.

FIG. 1 illustrates an example hoist system 20 including an upper box 22 which may house features such as a motor, gearing, braking, etc. A hoist chain 24 is driven up and down by a chain drive arrangement in the upper box 22, to raise and lower a load 26. A rotary assembly 28 is provided between the chain 24 and the load 26 for allowing rotation of the load 26 relative to the box 22 and for allowing transmission of electric and/or pneumatic therethrough. Electrical signals may be sent through the rotary assembly 28 and also communicated via a flexible cable assembly 30 coiled around the chain 24. A control handle 31 may be provided at the fixture 29 and may receive electrical and/or pneumatic from the rotary assembly 28 in some examples. Although an example hoist system 20 is described, other types and configurations of hoists, including those with cables instead of chains in some examples, will benefit from this disclosure. For purposes of this disclosure, the term “hoist” is defined to be inclusive of air balancers.

Figure 2:
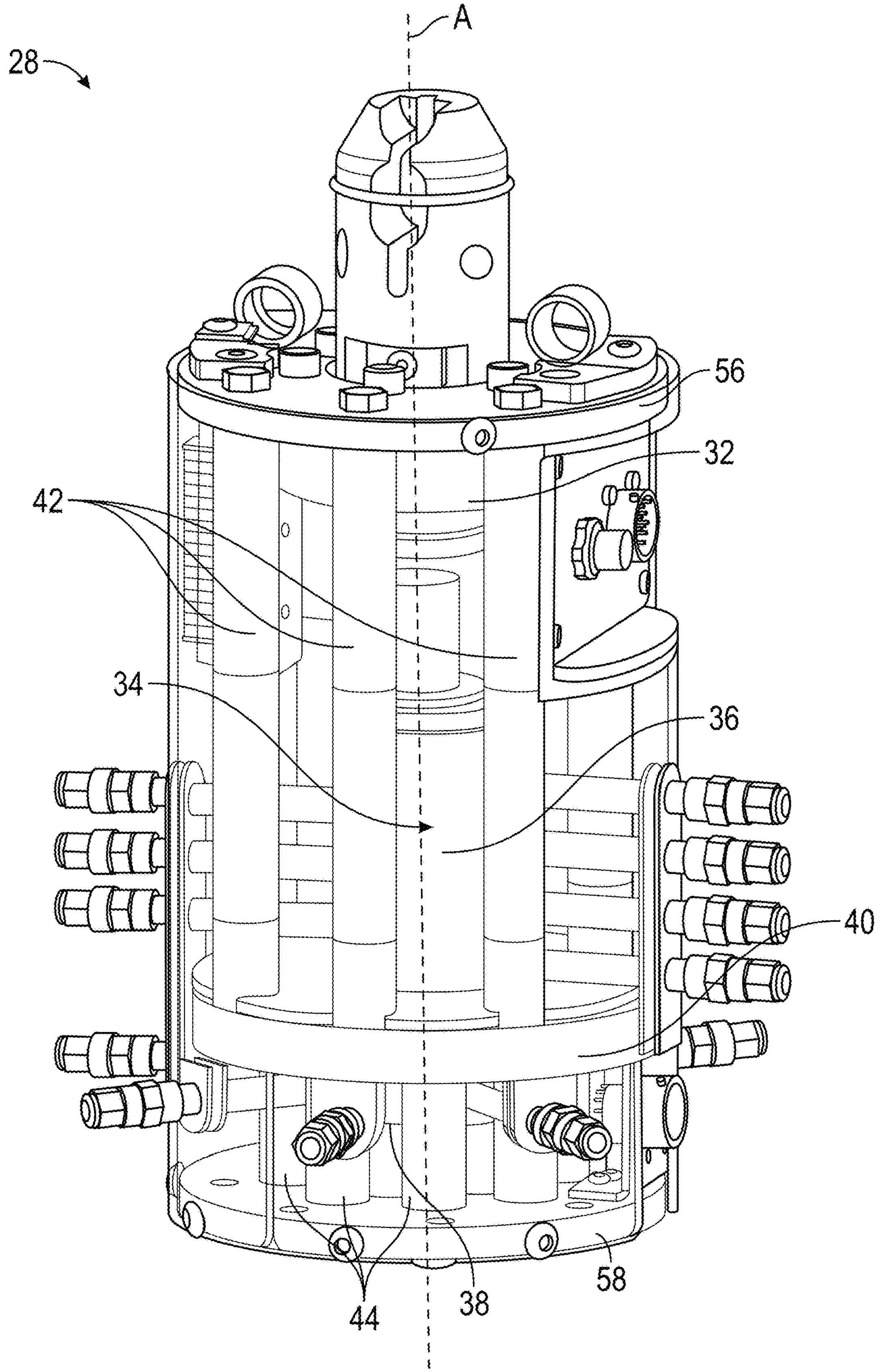
FIG. 2 illustrates an internal view of an example rotary assembly.

FIG. 2 illustrates an internal view of the example rotary assembly 28. The example rotary assembly 28 is a load cell assembly including a load cell 32 for determining a force, such as weight, associated with the load 26 (see FIG. 1). Such readings may then be electronically communicated to another location or device in some examples. In examples with a load cell, the rotary assembly 28 is utilized to send electrical signals indicative of the weight of the load 26 back up the hoist 20 (See FIG. 1), such as to a controller (not shown). In some examples, the rotary assembly 28 may not include a load cell. As shown, a rotary union 34 may be provided and includes a first cylinder 36 and a second cylinder 38 rotatably attached to the first cylinder 36. The example rotary union 34 is for providing a seal between a stationary supply passage and a rotating component, such as the cylinder 38 in the example, allowing the flow of a fluid into and/or out of the rotating component. The example second cylinder 38 is rotatable about a central axis A in a clockwise direction and a counterclockwise direction. In some examples, as shown, the first cylinder 36 is positioned above the second cylinder 38 with respect to the orientation shown in FIG. 2, which is the normal orientation of the example rotary assembly 28 when used in a hoist. The first cylinder 36 may be fixed against rotation.

Figure 3:
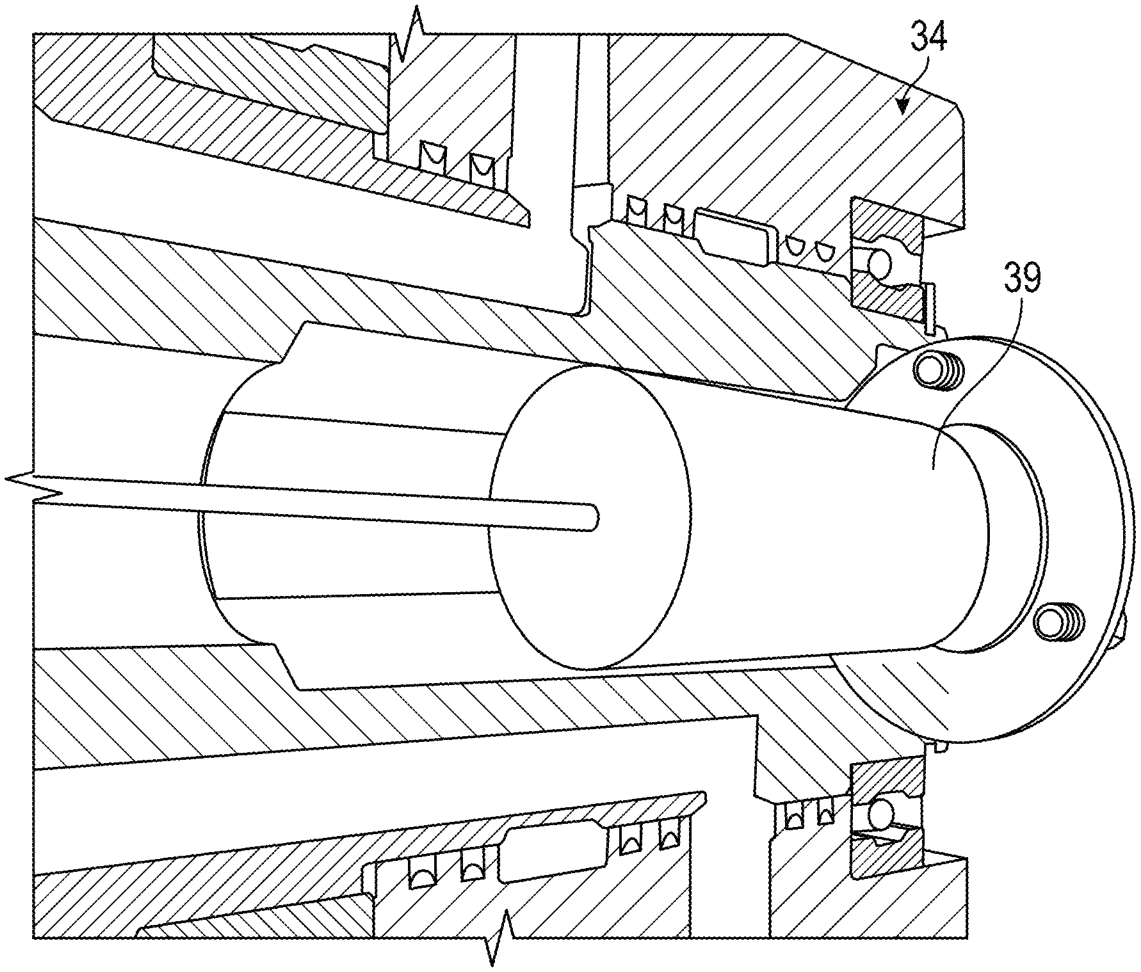
FIG. 3 illustrates an example slip ring.
Figure 8:
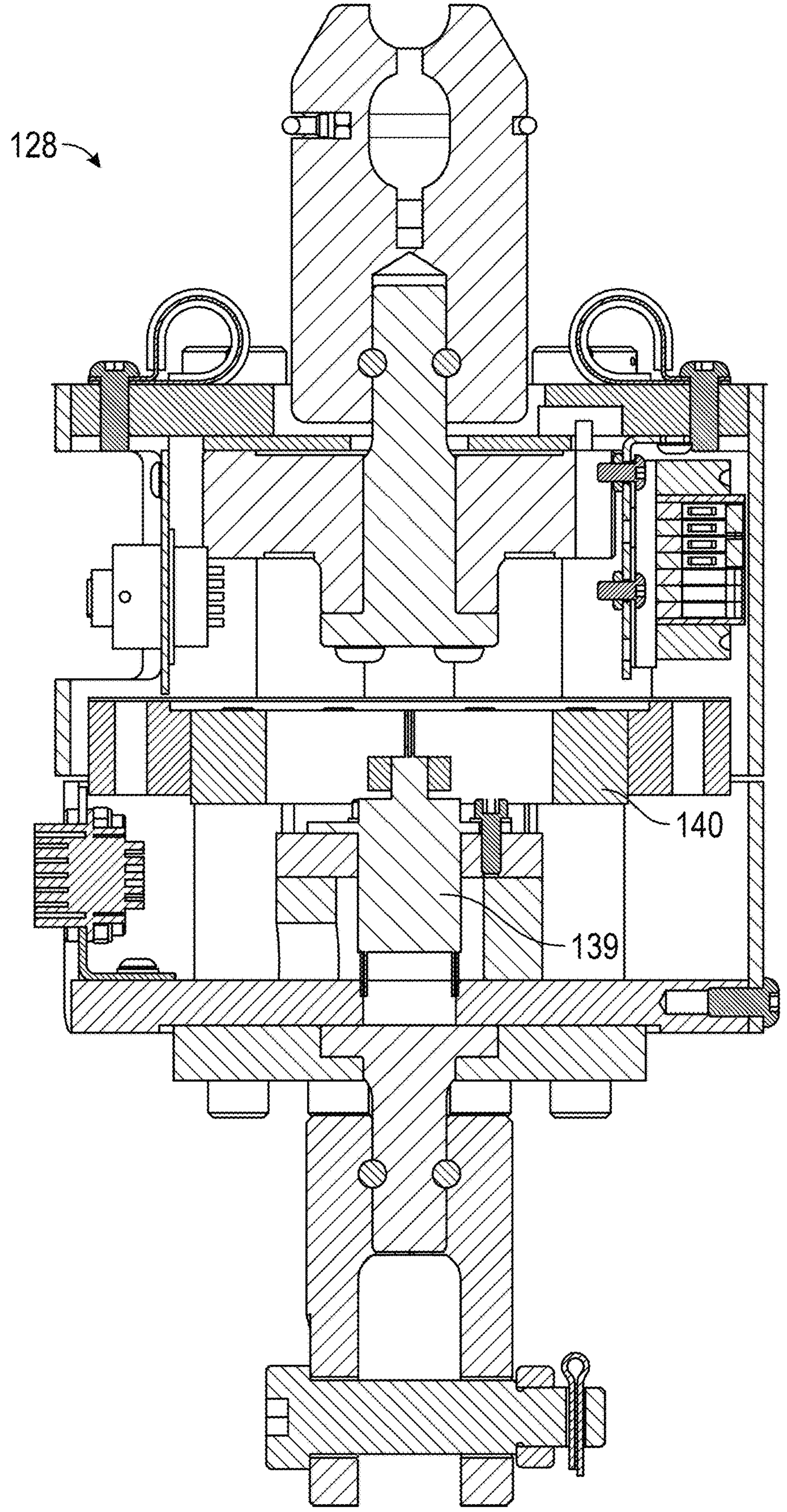
FIG. 8 illustrates another example rotary assembly.

As shown in FIG. 3, a slip ring 39 may be integrated with the rotary union 34 in some examples for transmission of power and electrical signals from stationary to rotating structure. In other examples, such as in applications when transmission of fluid is not needed, rotary assemblies similar to the examples described herein may include a slip ring 39 for transmission of power and electrical signals without a rotary union for fluid transmission. An example rotary assembly 128 having a slip ring 139 but without a rotary union is shown in FIG. 8.

Figure 4:
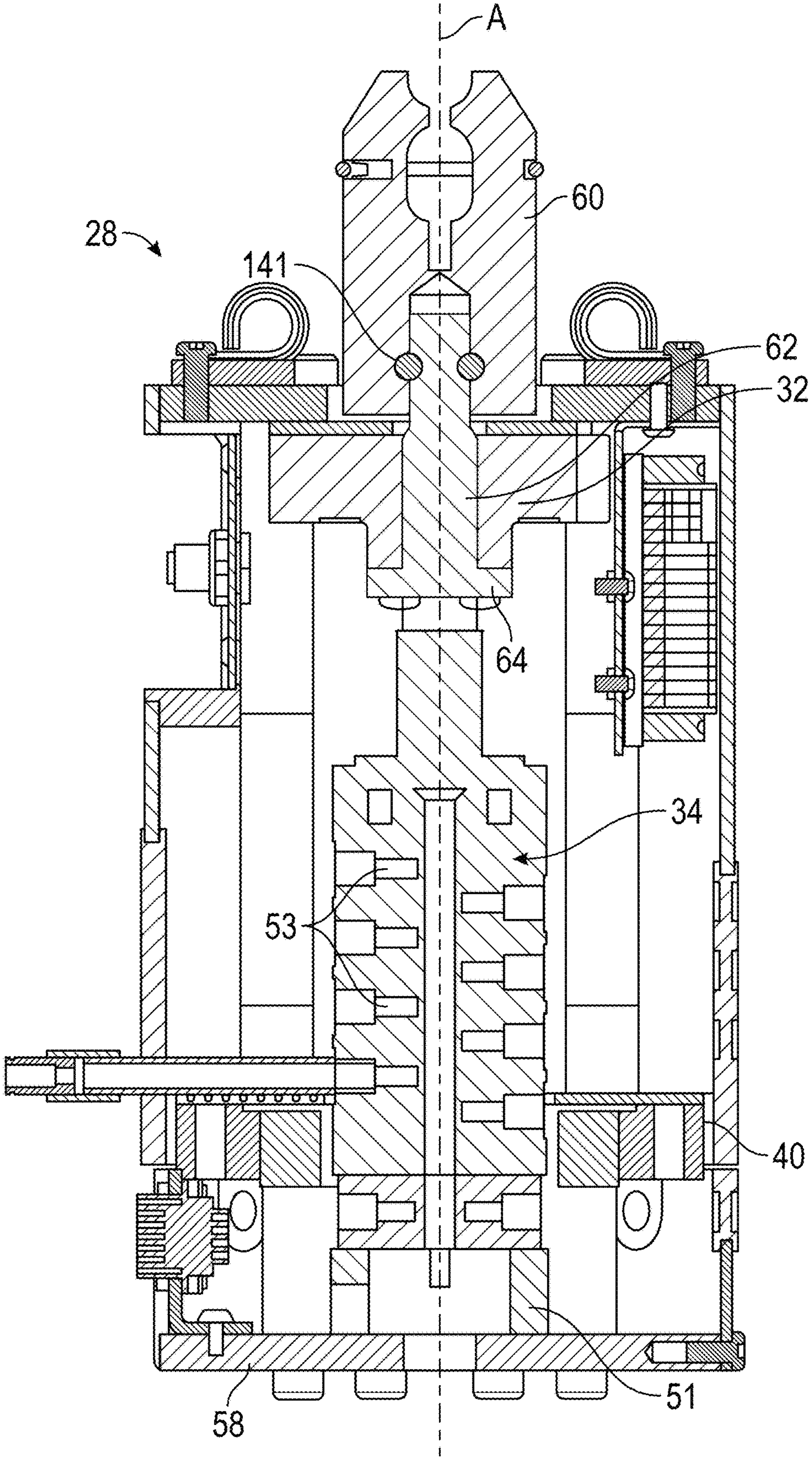
FIG. 4 illustrates a cross-sectional view of the example rotary assembly of FIG. 2.

FIG. 4 illustrates a cross sectional view of the example rotary assembly 28. A bearing 40 is positioned radially outward of the rotary union 34 with respect to the central axis A and includes at least one rotatable component about the central axis A. The rotary union 34 may be supported axially on a spacer 51 between the rotary union 34 and a lower plate 58.

Referring back to FIG. 2, a first group of axially extending support columns 42 are positioned radially outward of, and at least partially axially aligned with, the first cylinder 36 and fixed to the bearing 40. A second group of axially extending support columns 44 are positioned radially outward of, and at least partially axially aligned with, the second cylinder 38 and fixed to the bearing 40. In some examples, as shown, the first group of axially extending support columns 42 are axially opposite the bearing 40 from second group of axially extending support columns 44. The second group of axially extending support columns 44 rotate about the central axis A with the second cylinder 38. The bearing 40 and the first and second group of axially extending support columns 42, 44 therefore bear the axial load from the load 26 (FIG. 1), such that the rotary union 34 does not bear the axial load from the load 26. The example bearing 40 is a ball bearing with one set of support columns 42, 44 fixed to the inner race and another set of support columns 42, 44 fixed to the outer race. Other rotational bearing types are contemplated as within the scope of this disclosure and may be utilized in some examples.

Figure 5:
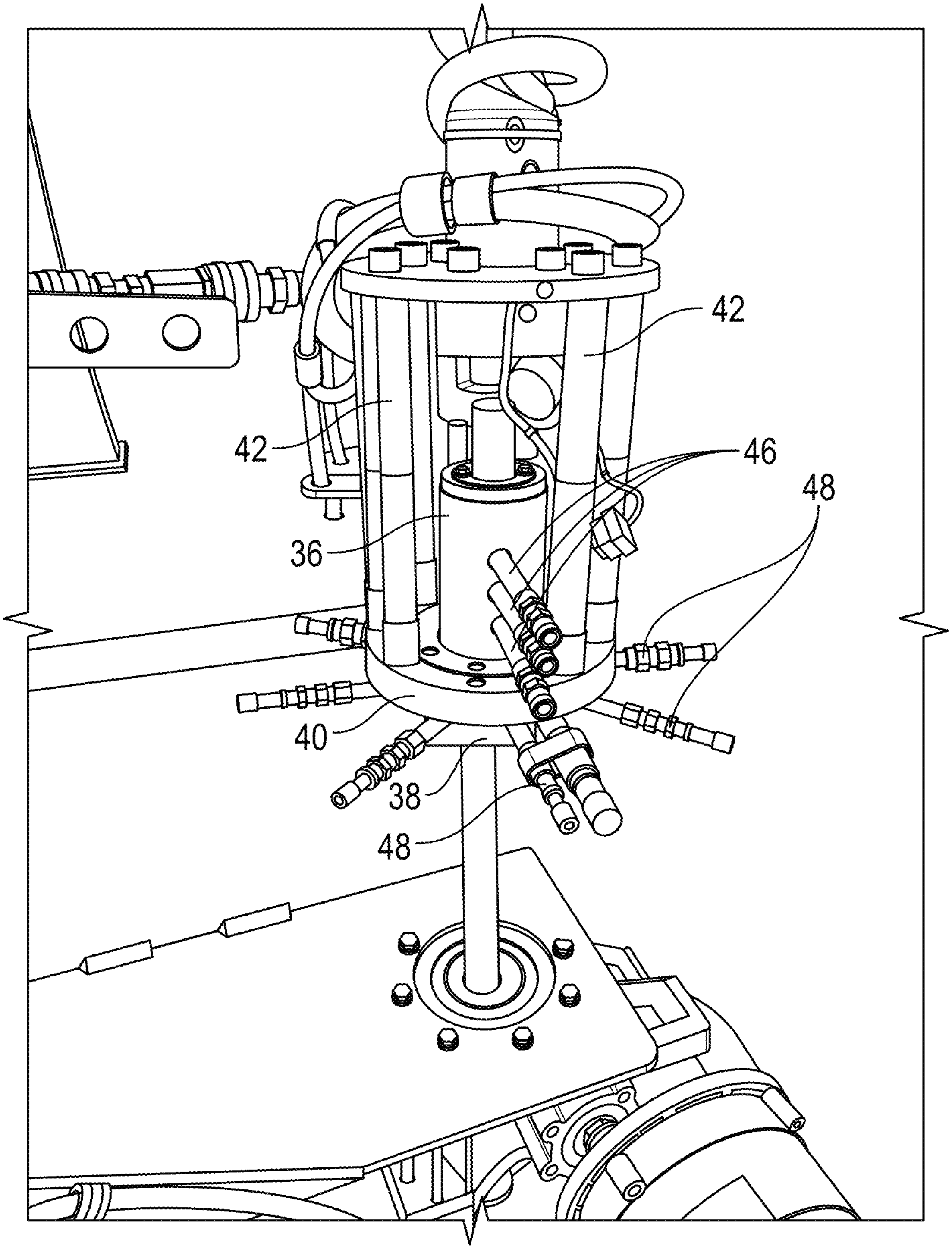
FIG. 5 illustrates the example rotary assembly of FIGS. 2 and 4, with the outer housings removed.

As shown in FIG. 5, one or more fluid ports extend from each of the first cylinder 36 and the second cylinder 38. Specifically, in the example, stator fluid ports 46 axially above the bearing 40 extend radially outward from the first cylinder 36 with respect to the central axis A. Circumferentially spaced rotary fluid ports 48 axially below the bearing 40 extend radially outward from, and rotate about the central axis A with, the second cylinder 38. The example rotary union 34 includes one or more internal fluid channels 53 (see FIG. 4) extending between the ports 46 and the ports 48 for allowing fluid flow and fluid communication between the ports 46 and the ports 48. In some examples, as shown, the ports 46 may be positioned circumferentially between adjacent ones of the support columns 42. Although one rotary union configuration is shown, other configurations, including those with ports extending in other directions than those shown, may be utilized. More or fewer ports than those shown in the examples may be utilized as well. In some examples, the ports disclosed herein are ⅛" NPT ports.

Figure 6:
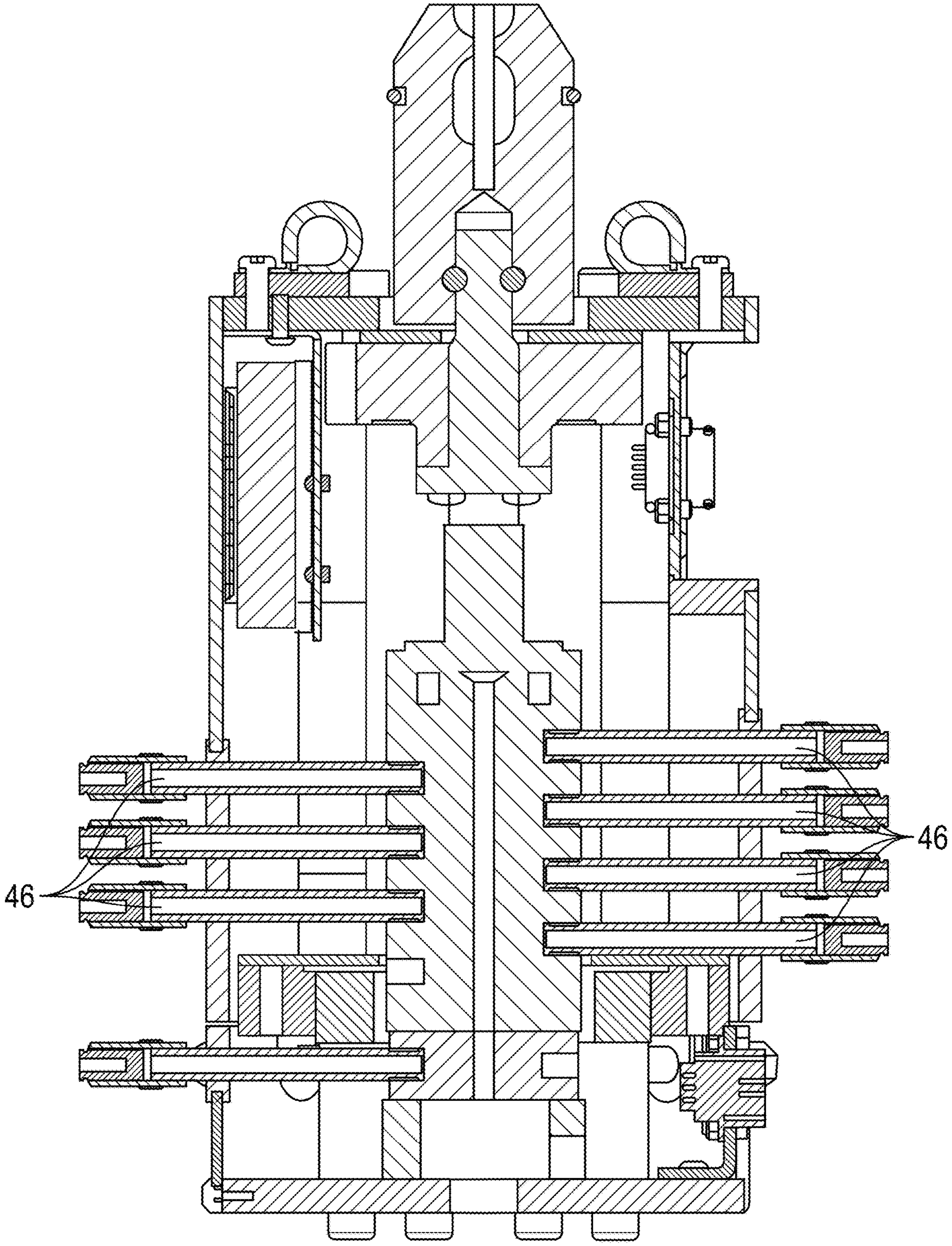
FIG. 6 illustrates a cross-sectional view of the example rotary assembly of FIGS. 2, 4, and 5.

As shown in FIG. 6, the ports 46 may extend from multiple circumferential locations of the first cylinder 36. At those circumferential locations, the ports 46 may be substantially circumferentially aligned and axially spaced from one another in some examples, as shown. Other configurations are contemplated.

Figure 7:
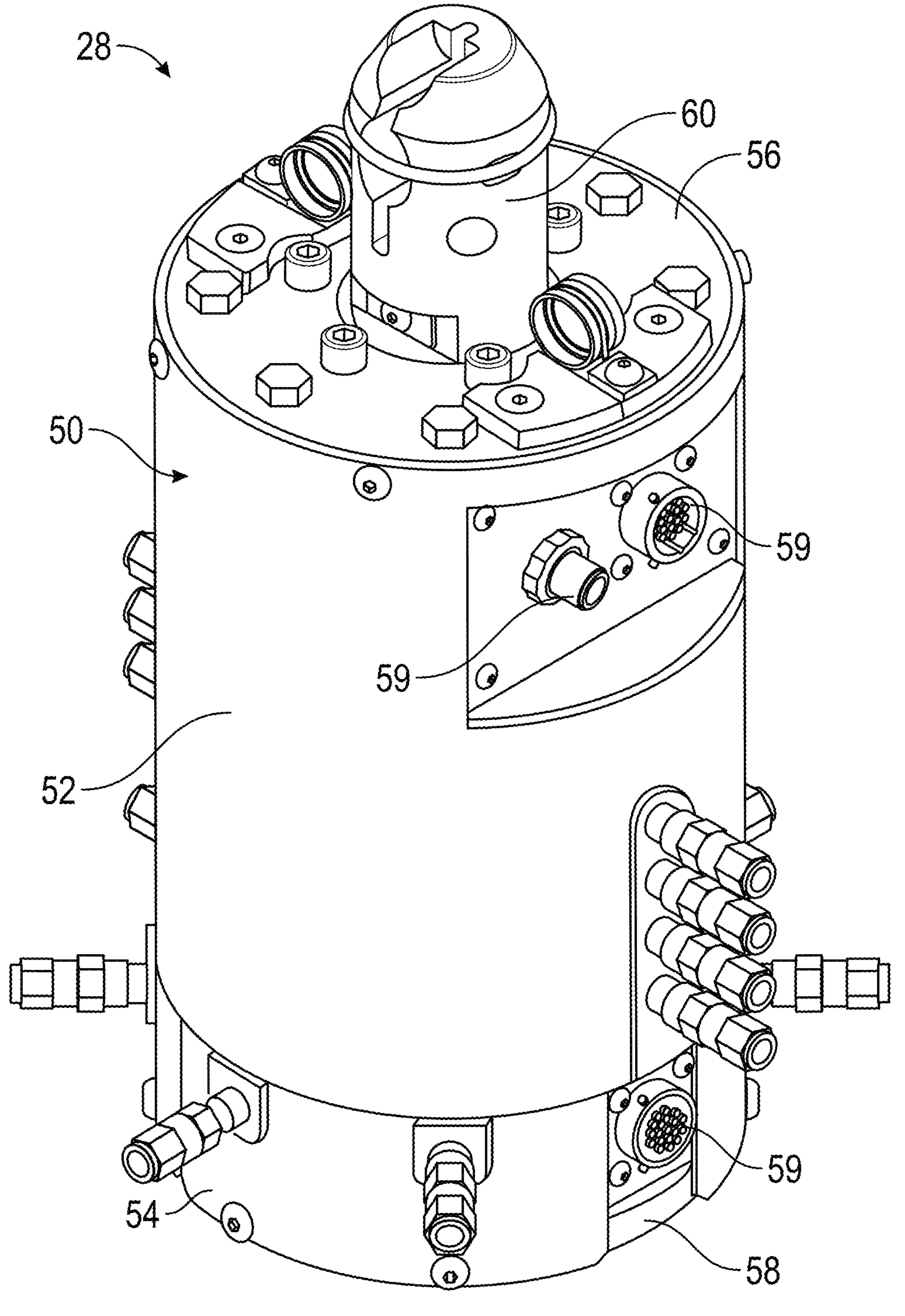
FIG. 7 illustrates the example rotary assembly of FIGS. 2 and 4-6.

As shown in FIG. 7, the example rotary assembly 28 may include an outer housing assembly 50, including a first outer housing cylinder 52, a second outer housing cylinder 54 rotatable with the second cylinder 38 (not shown), an upper plate 56 at an upper end of the first outer housing cylinder, and a lower plate 58 at the lower end of the second outer housing cylinder 54. As shown in the example, the ports 46 and 48 may extend through the outer housing cylinders 52, 54, respectively, for access. Electrical connectors 59 may be provided on the outer housing cylinders 52, 54 for transferring electrical into and out of the housing assembly 50. Referring back to FIG. 1, with continued reference to FIG. 7, the flexible cable assembly 30 connects at an electrical connector 59 at the outer housing cylinder 52. Electrical running from the cylinder 52 to the cylinder 54 may run through the slip ring 39 (not shown; see FIG. 3).

Referring to FIG. 7, a chain nest 60 may extend through and/or from the upper plate 56 for connection of the hoist chain 24 (not shown; see FIG. 1). Referring back to FIG. 4, in some examples, as shown, the chain nest 60 is fixed to a load shaft 62 including a flange 64 received upwardly against the load cell 32.

Referring back to FIG. 2, in examples with upper and lower plates 56, 58 as shown, the first group of axially extending support columns 42 extend axially from the upper plate 56 to the bearing 40. The second group of axially extending support columns 44 extend axially from the lower plate 58 to the bearing 40.

In some examples, the fluid transmitted is air for pneumatic applications, such as for pneumatic signals or volume. A control handle may be configured to receive fluid from the rotary union to perform functions associated with the load, such as up, down, clamp, unclamp, etc. In some examples, the pneumatic air may come from the plant's compressed air supply and be fed to a tool into a logic box, which will contain valves to route the air to the correct cylinder or pneumatic component. Other pneumatic applications are also contemplated. In the examples, there is also the option to combine multiple air ports on the example rotary unions to gain more volume for a single line.

FIG. 8 illustrates a cross-sectional view of an example rotary assembly 128 substantially similar to the example rotary assembly 28, but having a slip ring 139 without a rotary union. It should be understood that like reference numerals identify corresponding or similar elements throughout the several drawings. The slip ring 139 is positioned radially inward of the bearing 140.

Figure 9:
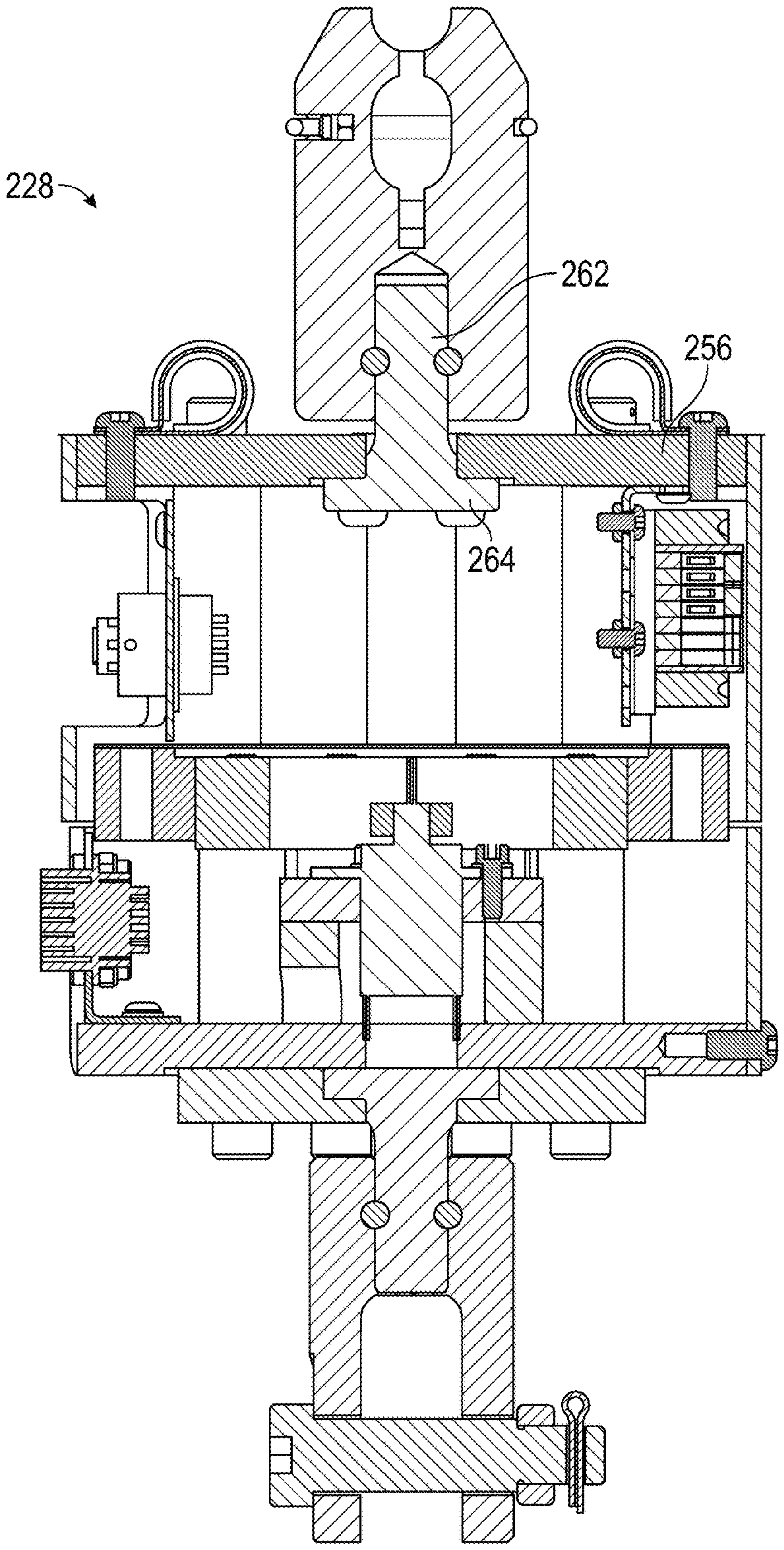
FIG. 9 illustrates another example rotary assembly.

FIG. 9 illustrates a cross-sectional view of an example rotary assembly 228 substantially similar to the example rotary assemblies 28, 128, except that a load cell is not included. In some examples, as shown, the flange 264 of the load shaft 262 is received directly against the upper plate 256. As disclosed, the example rotary assemblies in this disclosure may include load cells or be free of load cells, and may include one or both of a rotary union and a slip ring.

The examples disclosed herein allow for the transfer of pneumatic and/or electrical from the upper end of the hoist assembly to the lower end and/or the load, while allowing the load to spin 360 or more degrees in the clockwise and counterclockwise directions on the hoist. The examples disclosed herein prevent winding or tangling up of electrical cables, wires, air lines and safety chains. This may greatly reduce the chances of equipment damage and its associated downtime. In some examples, the example rotary assemblies can support capacities up to 1000 lbs.

An example rotary assembly for a hoist may include at least one of a rotary union and a slip ring. A bearing is positioned radially outward of the rotary union and/or slip ring with respect to a central axis. A first plurality of axially extending support columns are radially outward of the rotary union and/or slip ring and are fixed to the bearing. A second plurality of axially extending support columns are radially outward of the rotary union and/or slip ring and are fixed to the bearing. The second plurality of axially extending support columns are axially opposite the bearing from the first plurality of axially extending support columns.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A rotary assembly for a hoist, comprising:

a connection point positioned to receive and guide a hoist chain or cable during operation of the hoist;

at least one of a rotary union and a slip ring;

a bearing positioned radially outward of the at least one of a rotary union and a slip ring with respect to a central axis;

a first plurality of axially extending support columns radially outward of the at least one of a rotary union and a slip ring and fixed to the bearing; and a second plurality of axially extending support columns radially outward of the at least one of a rotary union and a slip ring and fixed to the bearing, the second plurality of axially extending support columns axially opposite the bearing from the first plurality of axially extending support columns.

2. The assembly of claim 1, wherein the at least one of a rotary union and a slip ring is a rotary union including a first cylinder and a second cylinder rotatably attached to the first cylinder and rotatable about the central axis, wherein the first plurality of axially extending support columns are at least partially axially aligned with the first cylinder, and the second plurality of axially extending support columns are at least partially axially aligned with the second cylinder.

3. The assembly of claim 2, comprising:

one or more first fluid ports extending radially outward from the first cylinder;

one or more second fluid ports extending radially outward from the second cylinder; and one or more internal fluid channels extending between the one or more first fluid ports and the one or more second fluid ports.

4. The assembly of claim 2, wherein the first cylinder is fixed against rotation, and the second cylinder is rotatable in a clockwise direction and a counterclockwise direction.

5. The assembly of claim 2, wherein the at least one of a rotary union and a slip ring includes both the rotary union and a slip ring, and the rotary union is integrated with the slip ring.

6. The assembly of claim 2, comprising:

an outer housing assembly including a first outer housing cylinder, a second outer housing cylinder rotatable with the second cylinder, an upper plate at an upper end of the first outer housing cylinder, and a lower plate at the lower end of the second outer housing cylinder.

7. The assembly of claim 6, wherein the first plurality of axially extending support columns extend axially from the upper plate to the bearing, and the second plurality of axially extending support columns extend axially from the lower plate to the bearing.

8. The assembly of claim 6, further comprising a load cell within the outer housing assembly for determining a force of a load of the hoist.

9. The assembly of claim 8, comprising a load shaft extending through the upper plate and having a flange received against the load cell, such that the load cell is received axially between the flange and the upper plate.

10. The assembly of claim 1, wherein the bearing and the first and second plurality of axially extending support columns are configured to bear a load of the hoist, and the at least one of a rotary union and a slip ring does not bear the load.

11. A rotary assembly for a hoist, comprising:

a connection point positioned to receive and guide a hoist chain or cable during operation of the hoist;

a rotary interface comprising at least one of a rotary union or a slip ring;

a bearing operatively associated with the rotary interface and configured to support rotation about a central axis;

a first plurality of columns extending axially and positioned radially outward of the rotary interface with respect to the central axis; and a second plurality of columns extending axially and positioned radially outward of the rotary interface, wherein at least one of the first or second plurality of columns is coupled to the bearing, the first plurality of columns extend in a first axial direction from the bearing, the second plurality of columns extend in a second axial direction from the bearing, and the second axial direction is opposite the first axial direction.

12. The assembly of claim 11, wherein the at least one of a rotary union and a slip ring is a rotary union including a first body and a second body rotatably attached to the first body and rotatable about the central axis, wherein the first plurality columns are at least partially axially aligned with the first body, and the second plurality columns are at least partially axially aligned with the second body.

13. The assembly of claim 12, comprising:

one or more first fluid ports extending from the first body;

one or more second fluid ports extending from the second body; and one or more internal fluid channels extending between the one or more first fluid ports and the one or more second fluid ports.

14. The assembly of claim 12, wherein the first body is fixed against rotation, and the second body is rotatable in a clockwise direction and a counterclockwise direction.

15. The assembly of claim 12, wherein the at least one of a rotary union and a slip ring includes both the rotary union and a slip ring, and the rotary union is integrated with the slip ring.

16. A rotary assembly for a hoist, comprising:

a connection point configured to receive and guide a hoist chain or cable during operation of the hoist;

a rotary interface including a rotary union;

a bearing operatively associated with the rotary interface and configured to support rotation about a central axis;

a first plurality of columns extending axially and positioned radially outward of the rotary interface with respect to the central axis; and a second plurality of columns extending axially and positioned radially outward of the rotary interface with respect to the central axis, wherein at least one of the first or second plurality of columns is coupled to the bearing;

wherein the rotary union includes a first body and a second body rotatably coupled to the first body and configured to rotate about the central axis; wherein the first plurality of axially extending columns are at least partially axially aligned with the first body, and the second plurality of axially extending columns are at least partially axially aligned with the second body.

17. The assembly of claim 16, comprising:

one or more first fluid ports extending from the first body;

one or more second fluid ports extending from the second body; and one or more internal fluid channels extending between the one or more first fluid ports and the one or more second fluid ports.

18. The assembly of claim 16, wherein the first body is fixed against rotation, and the second body is rotatable in a clockwise direction and a counterclockwise direction.

19. The assembly of claim 16, comprising:

an outer housing assembly including a first outer housing cylinder, a second outer housing cylinder rotatable with the second body, and an upper plate at an upper end of the first outer housing cylinder receiving the connection point;

a load cell within the outer housing assembly for determining a force of a load of the hoist; and a load shaft coupled to the connection point and extending through the upper plate and having a flange received against the load cell, such that the load cell is received axially between the flange and the upper plate.

20. The assembly of claim 16, wherein the connection point is a chain nest.

* * * * *